US006384372B1

(12) United States Patent
Sritulanont et al.

(10) Patent No.: US 6,384,372 B1
(45) Date of Patent: May 7, 2002

(54) METHOD AND SYSTEM FOR DUST AND FUME REMOVAL IN LASER MARKING MACHINES

(75) Inventors: Somboon Sritulanont, Nonthaburi; Supachai Vesaruch, Pathumthani; Pairoj Panomoupatham, Kalasin, all of (TH)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/619,984

(22) Filed: Jul. 20, 2000

(51) Int. Cl.[7] .............................................. B23K 26/12
(52) U.S. Cl. .............................................. 219/121.84
(58) Field of Search ........................ 219/121.6, 121.67, 219/121.68, 121.69, 121.7, 121.71, 121.72, 121.84

(56) References Cited

U.S. PATENT DOCUMENTS

| 3,866,398 | A | | 2/1975 | Vernon, Jr. et al. ........... 156/17 |
|---|---|---|---|---|
| 4,227,582 | A | * | 10/1980 | Price ........................ 219/121.7 |
| 5,298,717 | A | * | 3/1994 | DeRossett, Jr. ........ 219/121.68 |
| 5,375,613 | A | * | 12/1994 | Aindow et al. .......... 219/121.7 |
| 5,811,055 | A | * | 9/1998 | Geiger ......................... 266/49 |
| 5,905,266 | A | * | 5/1999 | Larduinat et al. ...... 250/492.21 |
| 6,130,904 | A | * | 10/2000 | Ishihara et al. ............... 372/59 |

FOREIGN PATENT DOCUMENTS

| EP | 0017442 A1 | 10/1980 |
|---|---|---|
| EP | 0829947 A1 | 3/1998 |
| GB | 2032825 A | 5/1980 |
| JP | 11028593 | 2/1999 |

\* cited by examiner

*Primary Examiner*—Samuel M. Heinrich
(74) *Attorney, Agent, or Firm*—Sawyer Law Group LLP

(57) ABSTRACT

Aspects for dust and fume removal for a laser marking machine are presented. In a system aspect, the system includes a vacuum assembly operating in accordance with the Coanda Effect to remove dust and fumes from a laser marking machine through suction. The system further includes a control mechanism coupled to the vacuum assembly for turning the vacuum assembly on and off. A drainage system, coupled to the vacuum assembly, discards the dust and fumes from the vacuum assembly away from a facility housing the laser marking machine.

19 Claims, 1 Drawing Sheet

METHOD AND SYSTEM FOR DUST AND FUME REMOVAL IN LASER MARKING MACHINES

FIELD OF THE INVENTION

The present invention relates to laser marking machines, and more particularly to dust and fume removal for laser marking machines.

BACKGROUND OF THE INVENTION

It has become increasingly popular to use a laser beam to mark the surface of a chip package. Laser marking is fast, requires no curing time, and produces a consistently high-quality mark with minimal set-up time. In laser marking machines, the laser beam basically burns a mark into the surface of the article of manufacture to produce a permanent mark. In the case of a packaged chip, the laser marking creates a different reflectivity from the rest of the package surface. Thus, by holding the chip at an angle to a light source, the information inscribed on the chip by the laser can easily be read.

During the marking of packages of integrated circuits with logos, date, part number, and other package identifiers using a laser marking machine, dust and fumes are generated within the laser mark chamber of the equipment. The generated dust and fumes need to be removed quickly, continuously, and effectively in order to prevent deleterious impact on the quality of the products. Traditionally, the dust and fumes are removed from work environments, such as a laser chamber, using a standard industrial vacuum cleaner. FIG. 1 illustrates a diagram of a traditional dust removal system. As shown, the system includes a nozzle 10 coupled to a vacuum cleaner 12 and inserted into a laser marking chamber 14 of a laser marking machine 16 positioned on a raised floor 18. The performance of the standard vacuum cleaner 12 to remove dust and fumes from the laser mark operation isn't very satisfactory, however, due to several shortcomings. These shortcomings include the need to regularly clean out the dust collection bags of the vacuum cleaner 12. Further, the vacuum cleaner 12 doesn't remove fumes effectively, its motor is quite noisy, and the operating and maintenance costs are very high.

Accordingly, what is needed is a method and apparatus for dust and fume removal for a laser marking machine that avoids the shortcomings of traditional vacuum cleaner approaches.

SUMMARY OF THE INVENTION

Aspects for dust and fume removal for a laser marking machine are presented. In a system aspect, the system includes a vacuum assembly operating in accordance with the Coanda Effect to remove dust and fumes from a laser marking machine through suction. The system further includes a control mechanism coupled to the vacuum assembly for turning the vacuum assembly on and off. A drainage system, coupled to the vacuum assembly, discards the dust and fumes from the vacuum assembly away from a facility housing the laser marking machine.

Through the present invention, a vacuum assembly is provided that lowers operating costs, as a result of little power consumption, no motor maintenance, no dust bags, etc., as compared with a traditional vacuum system. The present invention further achieves effective suction power and cleaning in a substantially noiseless assembly that is readily integrated into a drainage system of a plant's design.

These and other advantages of the present invention will be more readily understood in conjunction with the following detailed description and accompanying drawings.

DETAILED DESCRIPTION

The present invention relates to dust and fume removal in laser marking machines. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
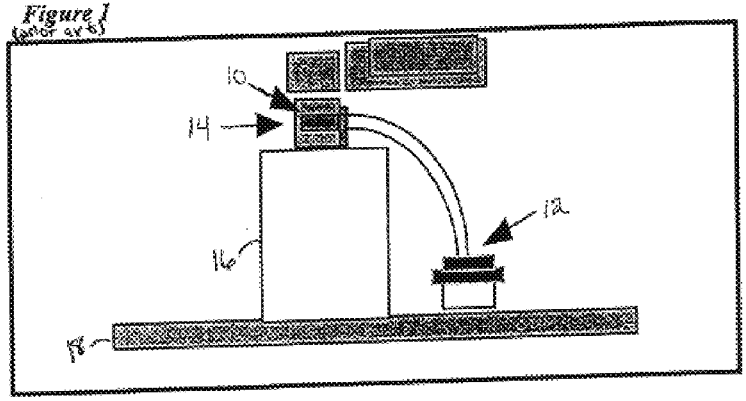
FIG. 1 illustrates a diagram of a prior art dust removal system for laser marking machines.
Figure 2:
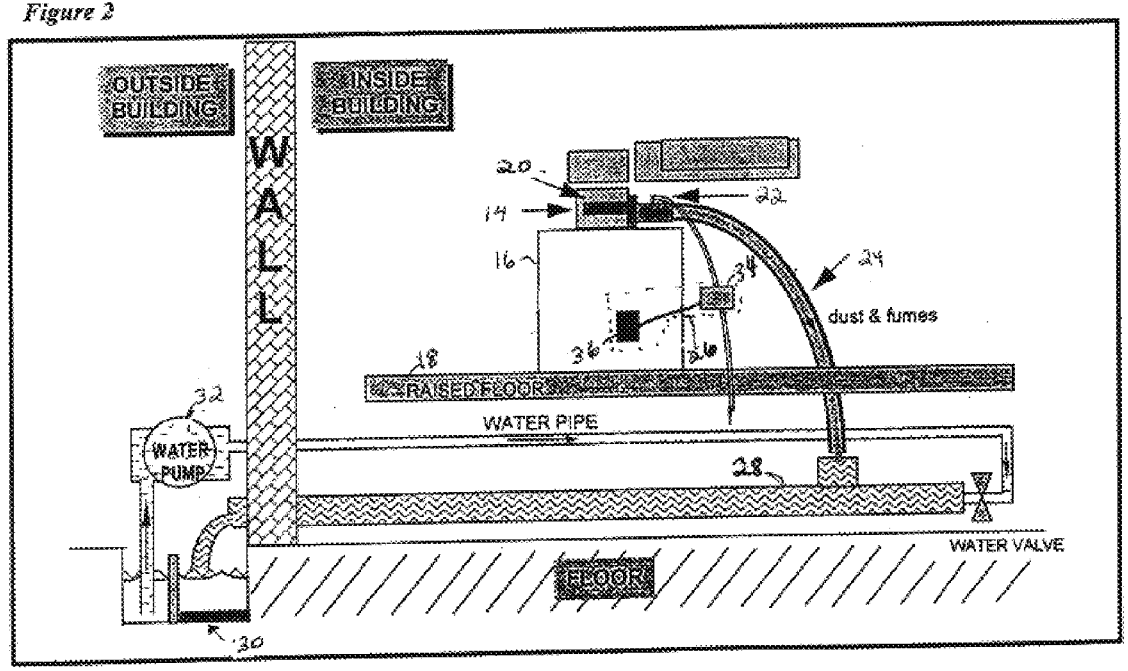
FIG. 2 illustrates a diagram of a dust and fume removal system in accordance with the present invention.

The present invention provides an assembly, which effectively removes dust and fumes from an enclosed environment, consuming little power, producing little noise, and costing very little in terms of maintenance. FIG. 2 illustrates a dust and fume removal system in accordance with the present invention. Included in the assembly of FIG. 2 are nozzle 20, air amplifier 22, dust hose 24, and control mechanism 26. The nozzle 20 preferably is provided as a square-shaped, stainless steel nozzle for installation in marking chamber 14. The nozzle 20 acts as the conduit through which the vacuum assembly removes dust and fumes through suction from the marking chamber 14.

A standard 1.25 inch vaccon air amplifier is suitable for air amplifier 22 and generates the vacuum that sucks dust and fumes from the marking chamber 14. The vacuum operates in accordance with the Coanda Effect, which refers to the observation that a stream of air (or other fluid) emerging from a nozzle tends to follow a nearby curved surface, if the curvature of the surface or angle the surface makes with the stream is not too sharp. Thus, in the vacuum operation, large volumes of air, gases, or dust are moved with a low input volume of compressed air emitted from an annular gap and passing over a curved surface into the throat of the unit. From the vacuum generated, the dust and fumes are removed via dust hose 24, e.g., a PVC dust hose, that connects the vaccon air amplifier 22 to a drain pipe 28 of a drainage system normally present in the facility housing the laser marking machine. The drain pipe 28 preferably leads to a sump 30 outside the facility building. A water pump 32 circulates water through the drainage system to ensure that all dust and fumes are promptly and effectively removed from the work environment inside the facility building.

In order to control the operation, preferably a solenoid valve 34 and programmable logic circuit (PLC) 36 are provided as the control mechanism 26 and coupled to the air amplifier 22. The solenoid valve 34 is activated by the PLC 36 installed on the laser marking machine 16, so that vacuum system is automatically switched on and off together with the laser marking machine 16.

With the assembly provided by the present invention, a lower operating cost is achieved, since there is little power consumption, no motor maintenance, no dust bags, etc., as compared with a traditional vacuum system. The present invention further achieves effective suction power and cleaning in a substantially noiseless assembly that is readily integrated into a drainage system of a plant's design. With the integration into a plant design, the present invention efficiently avoids the manual removal of collected dust.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for dust and fume removal for a laser marking machine comprising:
   a vacuum assembly operating in accordance with the Coanda Effect to remove dust and fumes from a laser marking machine through suction;
   a control means coupled to the vacuum assembly for turning the vacuum assembly on and off; and
   a drainage system coupled to the vacuum assembly for discarding the dust and fumes from the vacuum assembly away from a facility housing the laser marking machine.

2. The system of claim 1 wherein the vacuum assembly further comprises a nozzle, the nozzle inserted into a laser mark chamber of the laser marking machine.

3. The system of claim 2 wherein the vacuum assembly further comprises an air amplifier coupled to the nozzle for providing vacuum suction through the nozzle.

4. The system of claim 3 wherein the vacuum assembly further comprises a dust hose coupling the air amplifier to a drain pipe of the drainage system.

5. The system of claim 4 wherein the drainage system further comprises a sump system including a water pump for circulating water through the drain pipe in order to wash out the dust and fumes from the drain pipe.

6. The system of claim 3 wherein the control means further comprises a solenoid valve coupled to the air amplifier and a programmable logic circuit coupled to the solenoid valve for activating the solenoid valve.

7. The system of claim 6 wherein the control means activates and terminates together with the laser marking machine activation and termination.

8. A vacuum assembly for providing dust and fume removal from a laser marking machine, the vacuum assembly comprising:
   a nozzle, the nozzle inserted into a laser mark chamber of the laser marking machine
   an air amplifier coupled to the nozzle for providing vacuum suction through the nozzle;
   a dust hose coupling the air amplifier to a drain pipe; and
   a control means for turning the vacuum assembly on and off.

9. The assembly of claim 8 wherein the vacuum assembly operates in accordance with the Coanda Effect to remove dust and fumes from a laser marking machine through suction.

10. The assembly of claim 8 further comprising a sump system including a water pump for circulating water through the drain pipe in order to wash out the dust and fumes from the drain pipe.

11. The assembly of claim 8 wherein the control means further comprises a solenoid valve coupled to the air amplifier and a programmable logic circuit coupled to the solenoid valve for activating the solenoid valve.

12. The assembly of claim 11 wherein the control means activates and terminates together with activation and termination of operation of the laser marking machine.

13. A method for dust and fume removal for a laser marking machine comprising:
   providing a vacuum assembly operating in accordance with the Coanda Effect to remove dust and fumes from a laser marking machine through suction;
   utilizing a control means coupled to the vacuum assembly for turning the vacuum assembly on and off; and
   utilizing a drainage system coupled to the vacuum assembly for discarding the dust and fumes from the vacuum assembly away from a facility housing the laser marking machine.

14. The method of claim 13 wherein providing the vacuum assembly further comprises providing a nozzle, the nozzle inserted into a laser mark chamber of the laser marking machine.

15. The method of claim 13 wherein providing the vacuum assembly further comprises providing an air amplifier coupled to the nozzle for providing vacuum suction through the nozzle.

16. The method of claim 15 wherein providing the vacuum assembly further comprises providing a dust hose to couple the air amplifier to a drain pipe of the drainage system.

17. The method of claim 16 wherein utilizing the drainage system further comprises utilizing a sump system including a water pump for circulating water through the drain pipe in order to wash out the dust and fumes from the drain pipe.

18. The method of claim 15 wherein utilizing the control means further comprises utilizing a solenoid valve coupled to the air amplifier and a programmable logic circuit coupled to the solenoid valve for activating the solenoid valve.

19. The method of claim 18 wherein utilizing the control means further comprising utilizing the control means to activate and terminate operation of the vacuum assembly together with activation and termination of operation of the laser marking machine.

* * * * *